(12) United States Patent
Cohen

(10) Patent No.: US 10,652,390 B2
(45) Date of Patent: May 12, 2020

(54) CALL AUTHENTICATION SYSTEM AND METHOD FOR BLOCKING UNWANTED CALLS

(71) Applicant: Aaron Cohen, Atlantis, FL (US)

(72) Inventor: Aaron Cohen, Atlantis, FL (US)

( * ) Notice: Subject to any disclaimer, the term of this patent is extended or adjusted under 35 U.S.C. 154(b) by 0 days.

(21) Appl. No.: 15/954,440

(22) Filed: Apr. 16, 2018

(65) Prior Publication Data

US 2018/0302513 A1  Oct. 18, 2018

Related U.S. Application Data

(60) Provisional application No. 62/486,422, filed on Apr. 17, 2017.

(51) Int. Cl.
*H04M 3/436* (2006.01)
*H04M 3/42* (2006.01)
*H04M 1/663* (2006.01)
*H04M 1/665* (2006.01)

(52) U.S. Cl.
CPC .......... *H04M 3/436* (2013.01); *H04M 1/663* (2013.01); *H04M 3/42382* (2013.01); *H04M 1/665* (2013.01); *H04M 3/42059* (2013.01); *H04M 2201/60* (2013.01); *H04M 2203/6072* (2013.01); *H04M 2203/6081* (2013.01); *H04M 2203/651* (2013.01); *H04M 2250/60* (2013.01)

(58) Field of Classification Search
CPC .......... H04M 3/42068; H04M 3/4265; H04M 3/42042; H04M 3/436; H04M 3/42059; H04M 3/42153; H04M 2203/6072; H04M 1/663; H04M 1/665; H04M 3/42382; H04M 2201/60; H04M 2203/6081; H04M 2203/651; H04M 2250/60
USPC ............ 379/142.01, 142.04, 142.05, 142.06, 379/142.14, 142.16
See application file for complete search history.

(56) References Cited

U.S. PATENT DOCUMENTS

| | | | | |
|---|---|---|---|---|
| 7,742,468 | B2 * | 6/2010 | Vagelos | H04M 3/42263 370/356 |
| 8,646,060 | B1 * | 2/2014 | Ben Ayed | H04L 63/0853 726/9 |
| 9,060,057 | B1 * | 6/2015 | Danis | H04M 3/42059 |
| 9,332,119 | B1 * | 5/2016 | Danis | H04M 3/42042 |
| 9,350,858 | B1 * | 5/2016 | Roths | H04M 3/4365 |
| 9,762,583 | B2 * | 9/2017 | Guccione | G06F 21/33 |
| 2007/0121596 | A1 * | 5/2007 | Kurapati | H04L 29/06027 370/356 |
| 2008/0161111 | A1 * | 7/2008 | Schuman | A63F 13/10 463/41 |
| 2010/0104080 | A1 * | 4/2010 | Appelman | G06Q 10/107 379/142.04 |

(Continued)

*Primary Examiner* — Binh Kien Tieu

(57) ABSTRACT

A method for blocking unwanted calls has been provided. The includes intercepting a call being routed from a calling device to a receiving device. The intercepting occurs prior to the call being presented to the receiving device for an answer. The method further determines further routing of the intercepted call by comparing parameters of the intercepted call to one or more lists. If it is determined that the call should be authenticated, the method sends an authentication challenge to the calling device. If a response is received to the authentication challenge, the method determines whether the response is correct. If the response is correct, the method routes the call to the receiving device.

17 Claims, 6 Drawing Sheets

(56) References Cited

U.S. PATENT DOCUMENTS

| | | | |
|---|---|---|---|
| 2011/0026699 A1* | 2/2011 | Amir | H04M 15/06 379/142.05 |
| 2011/0265153 A1* | 10/2011 | Guccione | G06F 21/33 726/5 |
| 2013/0216032 A1* | 8/2013 | Latter | H04M 3/42042 379/142.01 |
| 2014/0010357 A1* | 1/2014 | Krishnan | H04M 3/4365 379/142.17 |
| 2016/0262017 A1* | 9/2016 | Lavee | G06F 21/31 |
| 2017/0026404 A1* | 1/2017 | Peeler | H04L 63/1458 |
| 2017/0048388 A1* | 2/2017 | Sharpe | H04M 3/436 |
| 2017/0116870 A1* | 4/2017 | Brem | G09B 5/04 |
| 2017/0310822 A1* | 10/2017 | Korn | H04M 3/4365 |
| 2019/0174000 A1* | 6/2019 | Bharrat | H04M 3/2218 |

* cited by examiner

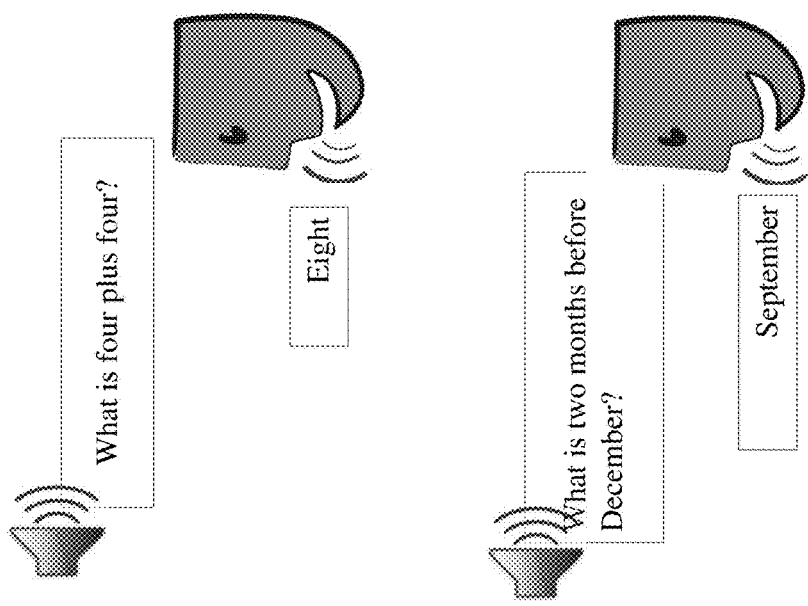
FIG. 3C
FIG. 3B
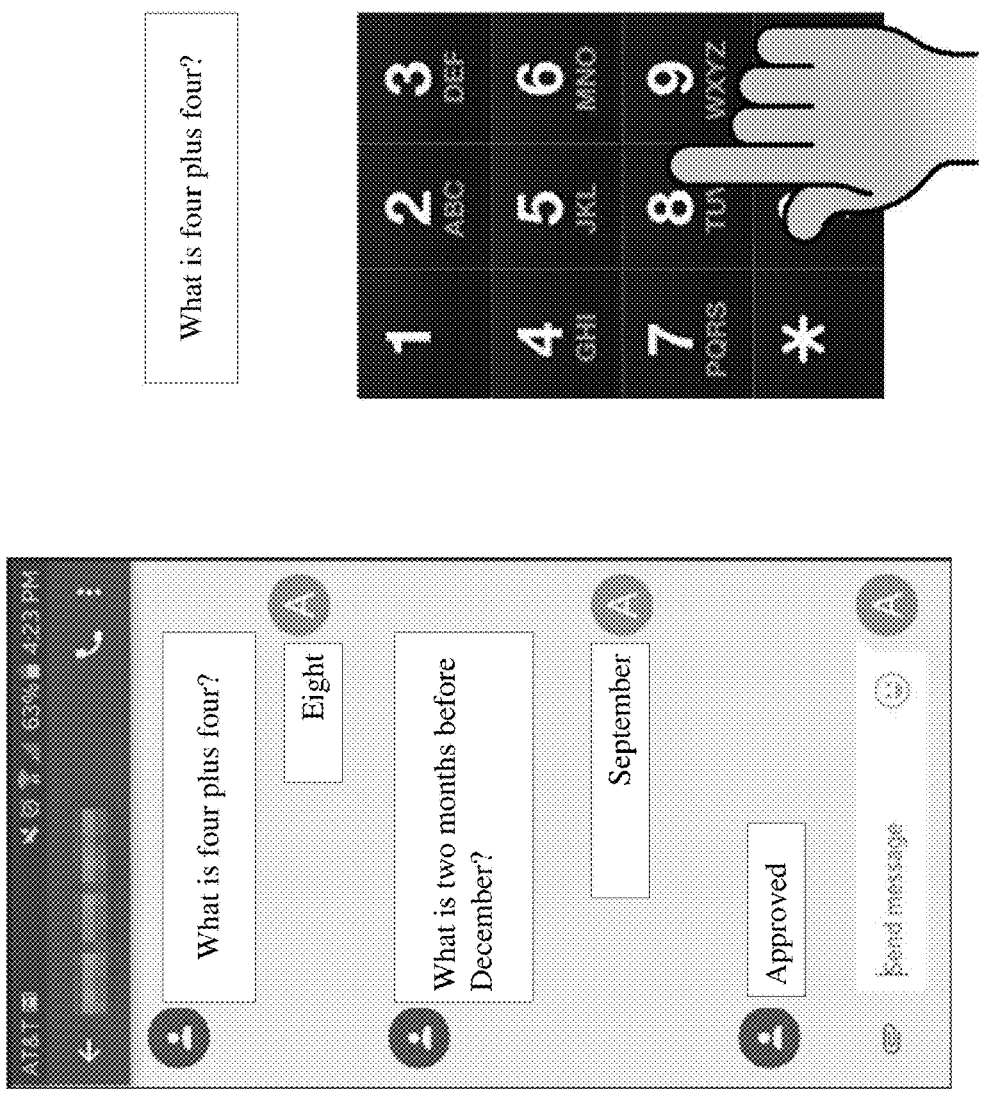
FIG. 3A

CALL AUTHENTICATION SYSTEM AND METHOD FOR BLOCKING UNWANTED CALLS

RELATED APPLICATIONS

This application is related to United States Provisional Application No. 62/486,422 (filed on Apr. 17, 2017), which is incorporated by reference herein for all purposes. The present application hereby claims priority under 35 U.S.C. § 119(e) to United States Provisional Application Nos. 62/486,422.

TECHNICAL FIELD

This disclosure is generally directed to call systems. More specifically, this disclosure is directed to a call authentication system and method for blocking unwanted calls.

BACKGROUND

Robo-callers are a growing problem. For most, such robo-callers are an unwanted invasions of privacy. The United States Federal Trade Commission asked companies to rise to the challenge to stop such robo-callers; however, such an "ask" has largely resulted in no suitable technologies. Most blocking technologies simply use a global blacklist to prevent calls or just to identify a would be robo-caller on such a list. These blocking technologies miss the evolving numbers used by new robo-callers. They also can result in false positives, frustrating those who would seek to legitimately make a call.

SUMMARY OF THE DISCLOSURE

According to an embodiment of the disclosure, a system intercepts calls and subject the caller to an authentication challenge to determine whether a call should be connected. The authentication challenge has differing levels of difficulty that would be difficult for a computer to respond to, but easy for a human.

A method for blocking unwanted calls has also been provided. This includes intercepting a call being routed from a calling device to a receiving device. The intercepting occurs prior to the call being presented to the receiving device for an answer. The method further determines further routing of the intercepted call by comparing parameters of the intercepted call to one or more lists. If it is determined that the call should be authenticated, the method sends an authentication challenge to the calling device. If a response is received to the authentication challenge, the method determines whether the response is correct. If the response is correct, the method routes the call to the receiving device or adds calling number to white list and requests the caller call back to have call go through.

Before undertaking the DETAILED DESCRIPTION below, it may be advantageous to set forth definitions of certain words and phrases used throughout this patent document: the terms "include" and "comprise," as well as derivatives thereof mean inclusion without limitation; the term "or," is inclusive, meaning and/or; the phrases "associated with" and "associated therewith," as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one off" when used with a list of items, means that different combinations of one or more of the listed items may be used, and only one item in the list may be needed. For example, "at least one of A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

BRIEF DESCRIPTION OF THE DRAWINGS

For a more complete understanding of this disclosure and its features, reference is now made to the following description, taken in conjunction with the accompanying drawings, in which:

FIGS. 3A, 3B, and 3C illustrate non-limiting example of authentication mechanisms;

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

Robo-callers have invaded the private lives of many. And, little has been done to stop such callers. Existing robo-call blockers are based on a so-called national blacklist. Among the problem with such lists are that (1) they are not customizable, (2) they don't filter out changing numbers, and (3) can provide false positives when a legitimate number should not be on the list. As a non-limiting example of the preceding, a new robo-caller can make calls for months before ultimate inclusion on a national blacklist. Certain embodiments of the disclosure address these problems.

Figure 1:
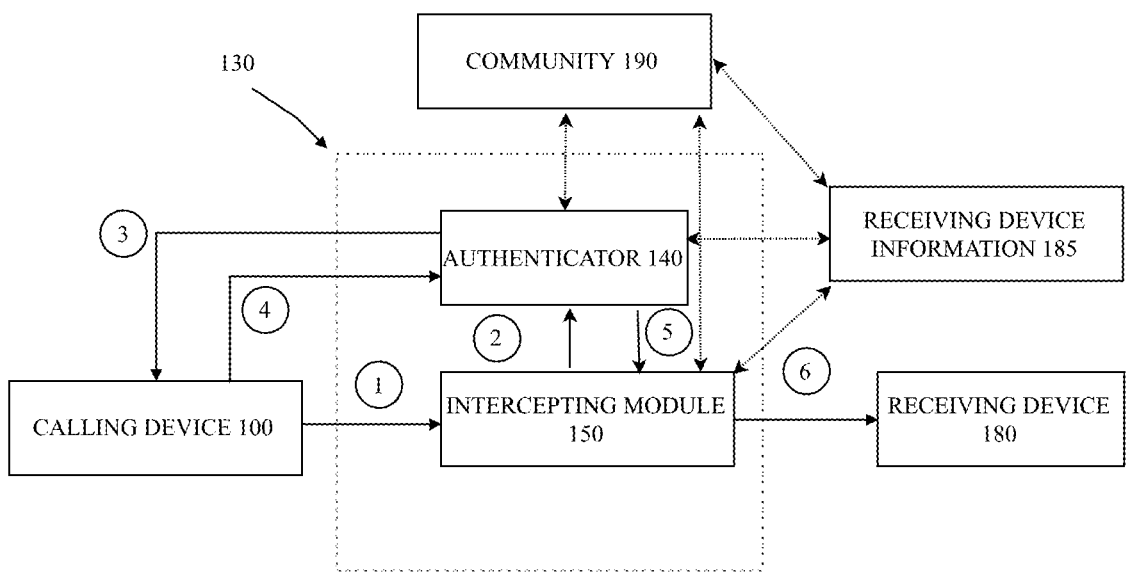
FIG. 1 illustrates with blocks high level aspects of embodiments of the disclosures.

FIG. 1 illustrates with blocks high level aspects of embodiments of the disclosures. Generally shown is a system 130 disposed between a calling device 100 and a receiving device 180.

The calling device 100 represents any system, device, software, or combination of the preceding capable of initiating a call. The calling device 100 includes robo-calling computers, desktop phones, internet protocol (IP) phones and the like. Likewise, the receiving device 180 may includes any system, device, software, or combination of the preceding capable of receiving a call. In particular configurations, the receiving device 180 may be a desktop phone, a mobile phone, an IP phone or the like. In other configurations, the receiving device 180 may be software on a mobile device or computer capable of receiving audio calls without necessarily having a phone number such as Google Hangouts and Skype. Additionally, while a "call" is generally referenced herein, certain embodiments are equally applicable to text messages. Thus, this disclosure should be understood to refer to multiple modalities of communications including audio and text messages.

A user may wish to disallow certain of such communications from the calling device 100 to make it through the receiving device 180. As an example, a user may wish for all robo-calls to not ring his or her receiving device 180. Accordingly, a task of certain embodiments of the disclosure is to filter out unwanted communications while still allowing wanted communications.

The system 130 may be located anywhere in route between a calling device 100 and the ultimate handling of a call on the receiving device 180. In particular configurations, the system 130 may be an application installed on a mobile device, for example, and "app" available on the Apple Itunes Store or Google Play store. In other configurations, the system 130 may be a module in a call routing server, for example, on popular cell phone carriers such as Verizon, AT&T. The ability to enable the system 130 in such carrier configurations is a simple routing of the calls through a new module. In still yet other configurations, the system 130 may be a specialized system where calls are rerouted or simultaneously rung to determine whether a call should go forward. In such a re-routing scenario, the call may be received at the receiving device, but re-routed before a ring before being sent on to the receiving device. In certain configurations, the system 130 may also require a calling device 100 to make multiple calls—one for updating a list described below and another after the update.

The system 130 in this configuration is shown with an intercepting module 150 and an authenticator 140. In particular configurations, the intercepting module 150 may be configurable. As an example, the intercepting module may be configured to intercept all calls and forward some or all for processing. As an example, one may configure the intercepting module 150 with customizable blacklists and whitelists that adapt in real-time. A whitelisted call may automatically be allowed to pass through to the receiving device 180. A blacklisted call may be automatically rejected without further processing. The remainder of the call may be forwarded on the authenticator 140 for a determination and/or updates of lists including the whitelist and blacklist.

A variety of other configurations and/or lists not explicitly relying on whitelists or blacklists may also be used. For example, one may configure all calls with certain area codes to be sent on to an authenticator 140. Likewise, calls with a blocked caller ID may be sent to the authenticator 140. In particular configurations, the intercepting module 150 may be a learning module that adapts its lists based on past user interactions and/or aggregated data (data from one intercepting module's interactions sent out for comparison with an aggregation of others, providing a feedback loop for aggregated trends). As an example, the intercepting module 150 may detect that a particular number has been dialed multiple times by a receiving device 180 (as indicated on a outgoing call log of the receiving device 180) although not listed as a contact by the receiving device. Accordingly, such a number may either be whitelisted or subjected to less authentication. Similarly, the intercepting module 150 may detect that a user usually whitelists calls from local numbers. Accordingly, local area codes may be subjected to less scrutiny of whitelisted altogether. As another example, the intercepting module 150 may detect that—on aggregate—most users blacklist a particular number. Accordingly, with such feedback loop of aggregate information, an intercepting module 150 may more greatly scrutinize such a call from such a number.

A community module 190 and receiving device information 185 provide additional information that may be used by the authenticator 140 and/or intercepting module 150 in handling of calls. The receiving device information 185 may contain information such a contact lists, outgoing call logs, and/or receiving logs. The community module 190 may have information on how prior authentication have been handled by others. Based on some or combinations of information from the community module 190 and receiving information device 185, calls can be dynamically handled—with feedback from one or the both providing individualized results for the receiving device 180. Both the community module 190 and receiving device information 185 are a two-way communication of information between the authenticator 140/intercepting module 185. As such a variety of enhanced information can be used for call handling. As an example, a calling device 100 may be trusted amongst contacts of a receiving device 180 as indicated by the community module 190. Accordingly, the call may be automatically whitelisted or subject to lower scrutiny. The user of the receiving device 180 can customize such a handling by updating customizable portions of the receiving device information 185 (e.g., trust calling devices trusted by more than 90% of my contacts). Contrary-wise, the community module 190 may also indicate from feedback from other users that a particular calling device 100 has failed authentication multiple times amongst community members or contacts. Such a number accordingly can dynamically and automatically be blacklisted. Again, a user of the receiving device 180 can update in the receiving device information 185 to automatically blacklist calls failing authentication by friend, contacts, or the certain granularities of a community.

The receiving device information 185 may additionally be allowed to rate calling device 100 based on actual interactions—not only for the user of the receiving device 180, but also for other in the community—including peers, friends, or others in a particular local.

In certain configurations, the dynamic handling of calls from a particular calling device 100 can be considered a crowd-sourced efforts amongst a community or set of friends. The same calling device 100 may be treated differently depending of the community chosen—friends, contacts, local, etc.

While such example techniques have been provided, yet others will be recognized one of ordinary skill in the art after review of this specification. Yet other details are described below with reference to FIGS. 6A and 6B.

Like the intercepting module 150, the authenticator 140 may also be customizable. For example, depending on the parameters of the call, the authenticator 140 may use different types of authentication mechanisms. As one non-limiting example, the authentication mechanism in the authenticator 140 may uses more difficult levels of authentication for parameters of a call that are suspicious—as may be reported from the intercepting module 150 or from an aggregation feedback loop from community module 190. Again, for such an aggregation feedback loop, information may come from a community and used on a variety of different granularities. As a non-limiting example, in a shared community configuration, the aggregate feedback loop may detect that all of a user's friends or a user's community reject a particular caller (e.g., because the calling device 100 failed authentication or received a lot of negative feedbacks as indicated by receiving device information 185) and hence, subject such a caller to greater scrutiny.

Yet other details are described below with reference to FIGS. 3A, 3B, and 3C. Although the level of scrutiny of a call or caller may be described as applying to just the intercepting module 150 and the authenticator 140, other configurations and/or modules may also be used in such a scrutinizing of a particular call.

The following provides a high-level flow for a call with reference to Flows 1, 2, 3, 4, 5, and 6 of FIG. 1. The intercepting module 150 receives a call as shown by Flow 1. The intercepting module 150 determines the call should be passed to the authenticator 140 based on parameters of the call. If it is determined that the authenticator should handle the request, the intercepting module 150 hands off the call to the authenticator 140 at Flow 2. The authenticator 140 also look at the parameters of the call to determine the appropriate authentication mechanism. As show in Flow 3, the authenticator 140 sends one or more authentication challenges to the calling device. This may be an audio message, a text-based message, or other suitable authentication challenge. A user operating the calling device 100 issues the appropriate challenge response as shown in Flow 4. Upon receiving the authentication response as shown by Flow 4, the authenticator 140 determines whether the response is correct and sends a response back to the intercepting module 150, which can register the call, for example, on a list and send the call onto the receiving device 180 as shown by Flow 6. In particular configuration, a first call may result in an authentication/registration process whereas subsequent calls are passed through with no challenge.

The Authenticator 140 and/or intercepting module 150 may also send supplemental information onto the receiving device 180. Additionally, in particular configurations, the authenticator 140 may send the call directly to the receiving device 180.

Figure 2:
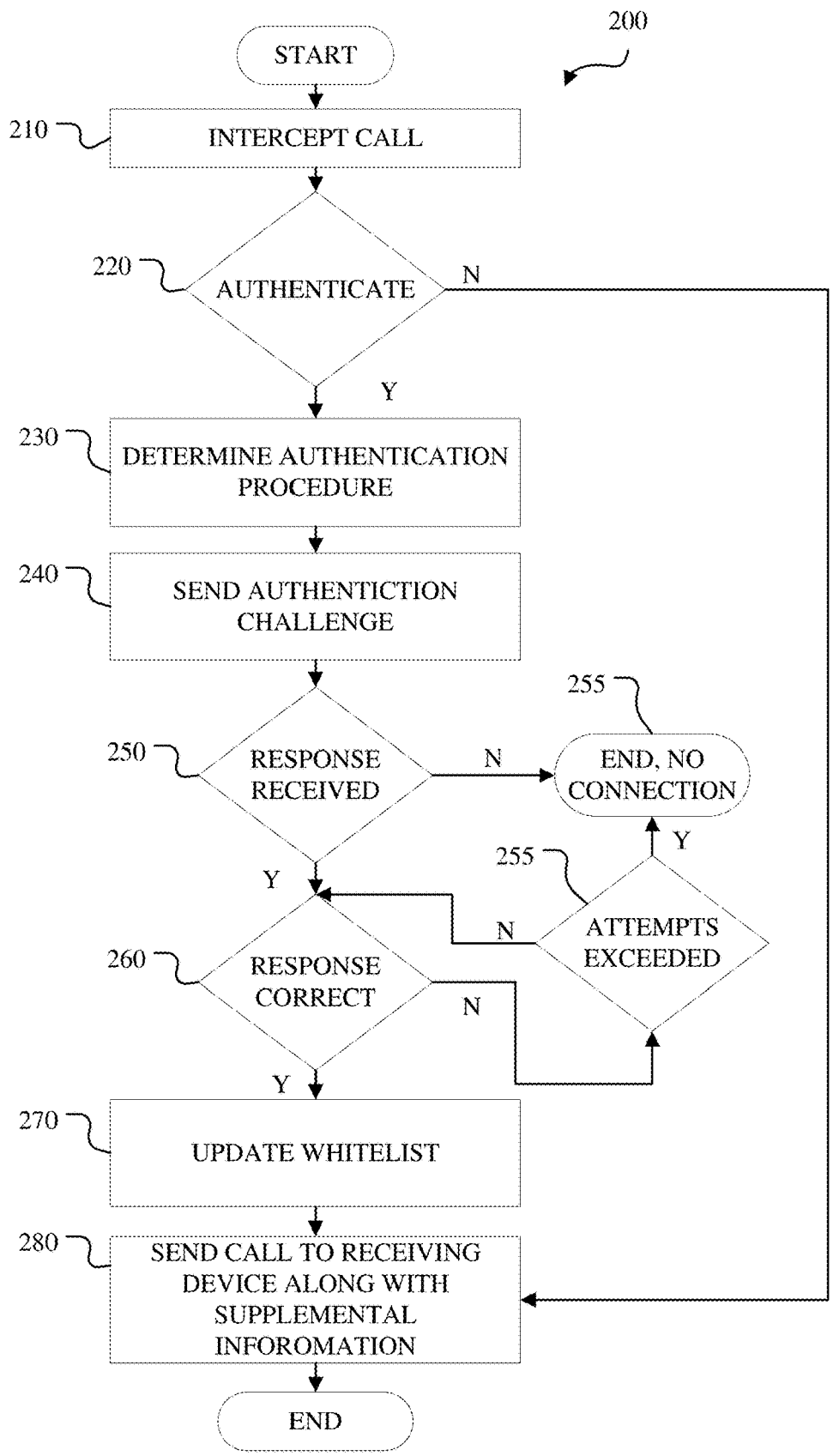
FIG. 2 illustrates an example process according to an embodiment of the disclosure.

FIG. 2 illustrates an example process 200 according to an embodiment of the disclosure. Although specific steps will be shown in the process 200 of FIG. 2, more, less and different steps may be utilized.

The process 200 intercepts a call at step 210 to allow further consideration as to whether the call should be further routed. This interception may occur anywhere in the route of an actual answering of the call, including at the phone itself (e.g., an application) or in a call server before signals for the call are communicated.

A determination as to whether or not an authentication is needed occurs at step 220. This determination can consider a variety of information. As referenced herein, a variety of configurable parameters can be considered such as whitelists and filters. In certain configurations, all calls may be required to authenticate. In other configurations, only certain calls may be required to authentication such as, for examples, calls from a certain area code. Both inclusive and exclusive lists can be utilized. And, such lists can be customized and utilize learning to dynamically update the list. As an example, a dynamically updateable whitelist may recognize that a particular user has called a particular number several times; accordingly, the system may automatically update a whitelist to include the number on such a whitelist for a time period. Additionally, a person's contact list may be whitelisted.

At step 230, the process 200 determines the appropriate authentication procedures based at least, in part, on the parameters of the call. As described above, varying challenges can be based on a trustworthiness of a call—some requiring higher scrutiny and other requiring less scrutiny.

At step 240, one or more authentication challenge are sent, for example, to the calling device 100. Non-limiting examples of such authentication challenges are shown in FIG. 2.

At step 250, a determination is made as to whether a response has been received. Certain robo-callers may not issue any response whatsoever. Accordingly, if no response is received, the "no" leg may be followed to step 255 where the process 200 ends with no connection of the call.

However, if a response is received, the "yes" leg is followed where a determination is made as to whether the response is received. Although a single response correct is shown, multiple responses can be evaluated. Certain legitimate users may not provide a correct response. Accordingly, as shown in step 257, a determination is made as to whether the maximum number of attempts has been received. If not, the user can attempt another response.

If the response and/or responses are correct, a whitelist may or may be updated at step 270. And, at step 280, the call is sent to the calling device with potential supplemental information concerning parameters of the call. In particular configurations, the call may be a subsequently required call with the first call being a registration on the whitelist.

FIGS. 3A, 3B, and 3C illustrate non-limiting example of authentication mechanisms. Although certain techniques are shown others, including Completely Automated Public Turing Test To Tell Computers and Humans Apart (CAPTCHA), other techniques may be utilized. As a non-limiting example, authentication may simply include pushing the number provided via audio.

As shown in FIG. 3A, a text message is sent to the phone of the caller ID with two authentication challenges. The correct response yields an approved message. Although certain techniques are shown here, others may be utilized—including those that may computationally challenging for a computer. As another non-limiting example, a CAPTCHA images that are hard for computer but much easier for a human to decipher may be sent via text message. In addition to authenticating the caller is not a robo-caller, the authentication technique of FIG. 3A also verifies the incoming caller ID is correct (as it is the number where the message is sent). In particular configurations, the authentication may only be designed to verify the number is correct—providing easy authentication challenges such as, respond with "1" or "Y."

As shown in FIG. 3B, an audio message with the authentication challenge is provided and a user of the calling device 180 can utilize a keypad to respond.

As shown in FIG. 3C, an audio message with the authentication challenge is provided and a user of the calling device 180 can speak a response. The authenticator can interpret the response to determine whether it is correct.

In yet other configurations, more detailed information concerning the caller may be required. To acquire such information, a text message with an internet link can be provided. Upon clicking on the link, a website associated with the link can obtain for example, the user of the location and a hardware based ID with the phone. If the number of the calling device does not corresponding to signature expected with the calling device, the call may not be allowed to go through. Alternatively, a code can be directly executed (e.g., communicated via text) on the calling device to extract appropriate information (e.g., location, hardware-based ID) for sending via text message back to the authenticator.

Such additional information may be used to correlate a spoofed number with additional information.

Figure 4C:
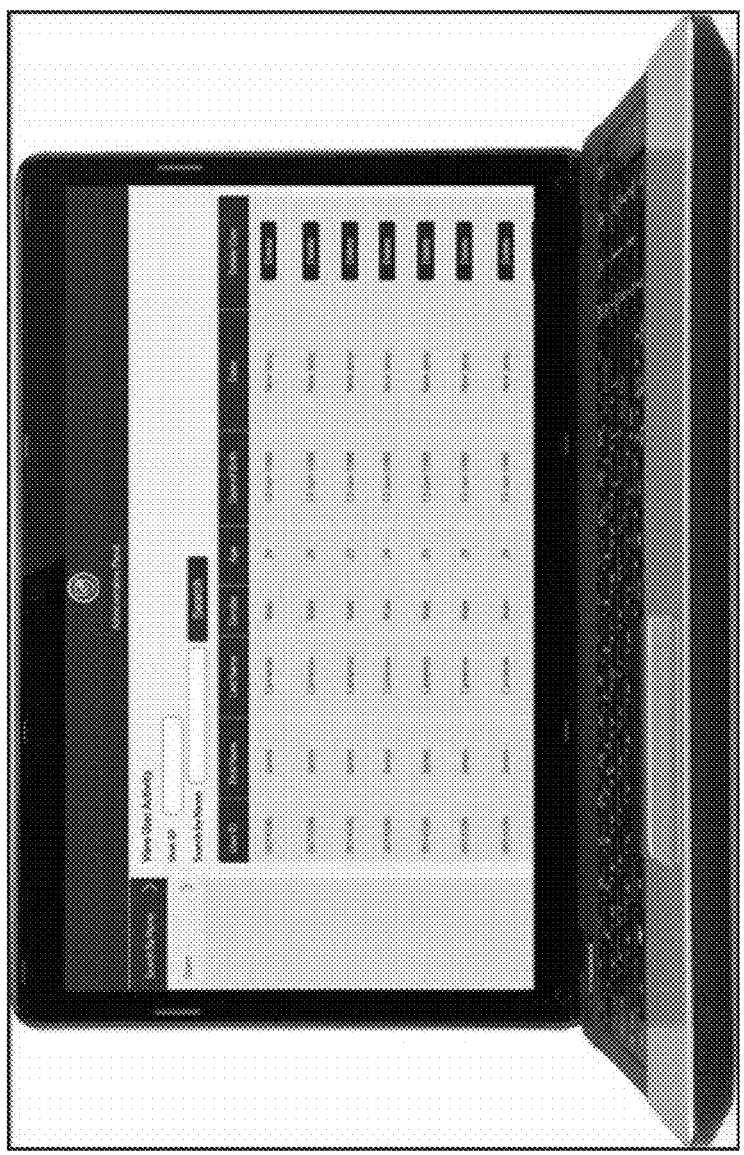
FIGS. 4A, 4B, 4C shows a log of prior interactions and/or calls according to an embodiment of the disclosure.
Figure 4A:
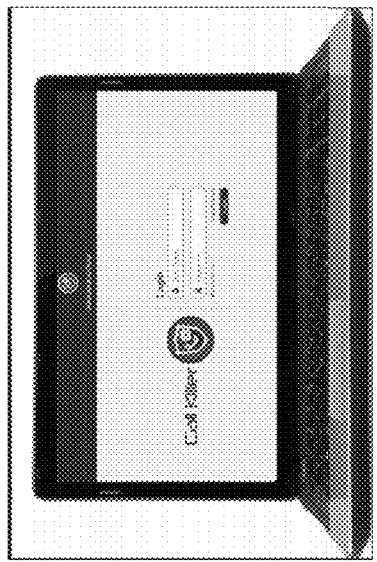
Figure 4B:
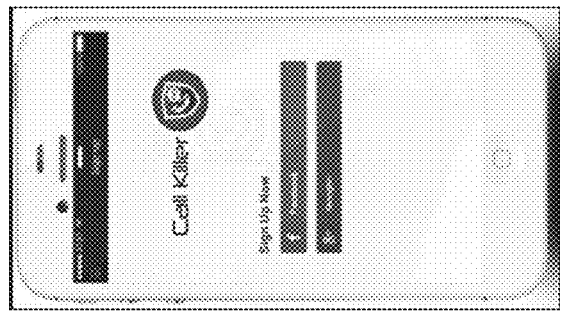

FIGS. 4A, 4B, 4C shows a log of prior interactions and/or calls according to an embodiment of the disclosure. As shown in FIGS. 4A and 4B, a user may access the log via a mobile phone or desktop computer—each being in sync with the other. FIG. 4C shows an example of logs. Both connected and non-connected calls can be shown. A user can flag calls for whitelist, backlist, or levels of authentication. And, the system can use such information to learn how other calls likely can be treated. Additionally, as alluded to earlier, certain information can be aggregated to create a trend for certain calling devices.

Figure 5B:
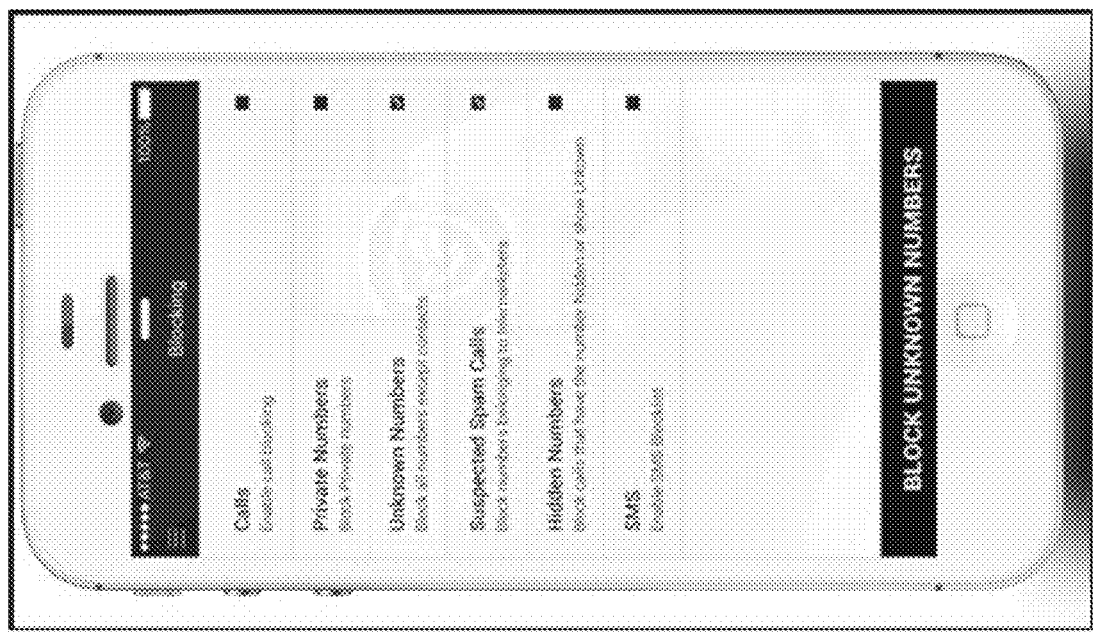
FIG. 5A and FIG. 5B one non-limiting example of creating filters for the system.
Figure 5A:
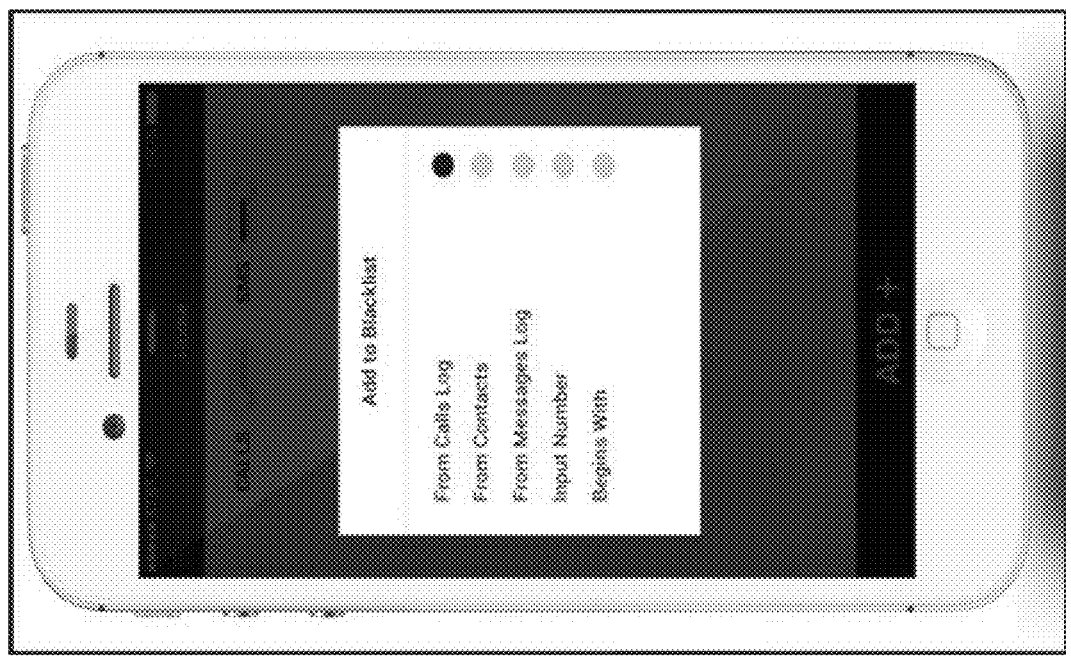

FIG. 5A and FIG. 5B one non-limiting example of creating filters for the system (here, a blacklist for FIG. 5A and a blocking for FIG. 5B). In certain configurations, a blacklist need not even go through the authentication procedure. The blocking of FIG. 6B correspond to which calls should be sent on to the authenticator.

Figure 6:
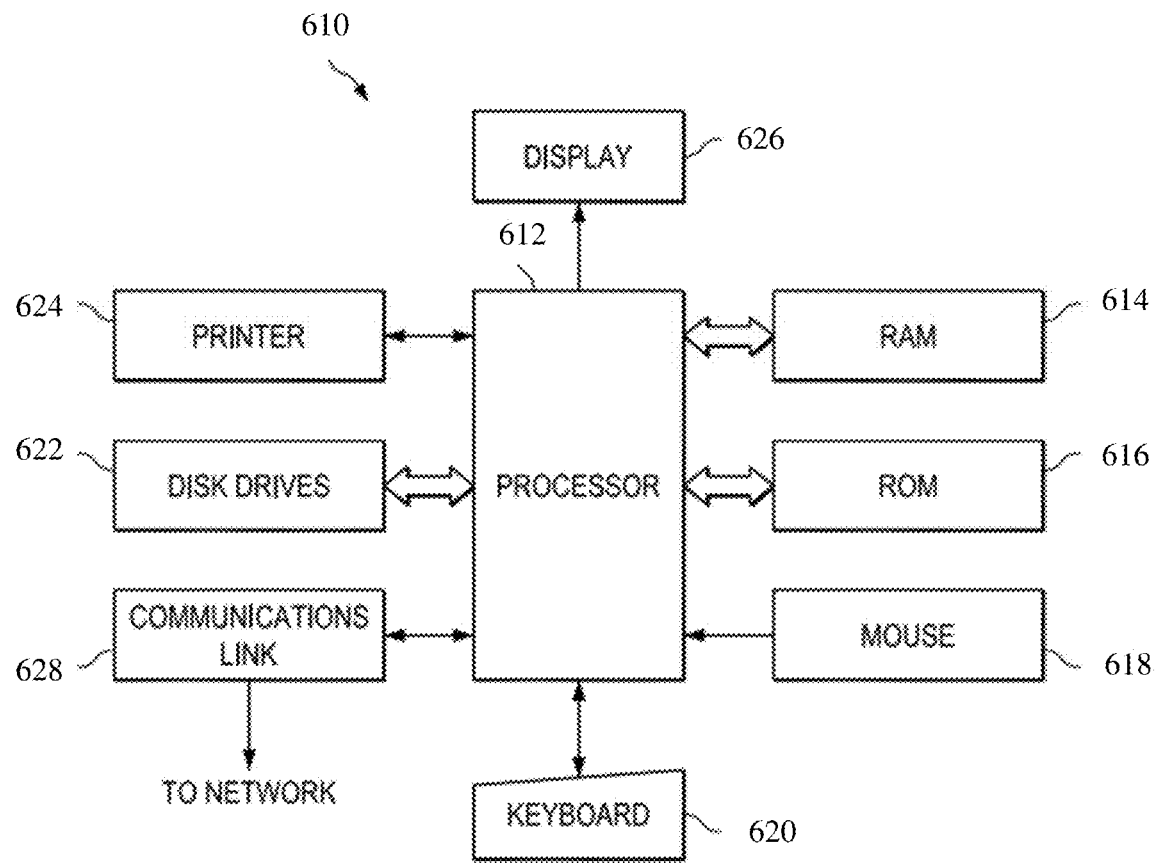
FIG. 6 show an embodiment of a general-purpose computer that may be used in connection with other embodiments of the disclosure to carry out any of the referenced functions described herein.

FIG. 6 is an embodiment of a general-purpose computer 610 that may be used in connection with other embodiments of the disclosure to carry out any of the above-referenced function. General purpose computer 4 may generally be adapted to execute any of the known OS2, UNIX, Mac-OS, Linux, Android and/or Windows Operating Systems or other operating systems. The general-purpose computer 610 in this embodiment includes a processor 612, a random access memory (RAM) 614, a read only memory (ROM) 616, a mouse 618, a keyboard 620 and input/output devices such as a printer 624, disk drives 622, a display 626 and a communications link 628. In other embodiments, the general-purpose computer 610 may include more, less, or other component parts. Embodiments of the present disclosure may include programs that may be stored in the RAM 614, the ROM 616 or the disk drives 622 and may be executed by the processor 612 in order to carry out functions described herein. The communications link 628 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 622 may include a variety of types of storage media such as, for example, floppy disk drives, hard disk drives, CD ROM drives, DVD ROM drives, magnetic tape drives or other suitable storage media. Although this embodiment employs a plurality of disk drives 622, a single disk drive 622 may be used without departing from the scope of the disclosure.

Although FIG. 6 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general-purpose computers 610 or other computers networked together in a computer network. Most commonly, multiple general-purpose computers 610 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 6, the logic includes computer software executable on the general-purpose computer 610. The medium may include the RAM 614, the ROM 616, the disk drives 622, or other mediums. In other embodiments, the logic may be contained within hardware configuration or a combination of software and hardware configurations.

The logic may also be embedded within any other suitable medium without departing from the scope of the disclosure.

It will be understood that well known processes have not been described in detail and have been omitted for brevity. Although specific steps, structures and materials may have been described, the present disclosure may not be limited to these specifics, and others may substituted as is well understood by those skilled in the art, and various steps may not necessarily be performed in the sequences shown.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for blocking unwanted calls, the method comprising:
   intercepting a call being routed from a calling device to a receiving device, the intercepting occurring prior to the call being presented to the receiving device for an answer;
   determining further routing of the intercepted call by comparing parameters of the intercepted call to one or more lists;
   if it is determined that the call should be authenticated, sending an authentication challenge to the calling device,
   if a response is received to the authentication challenge, determining whether the response is correct;
   if the response is correct, routing the call to the receiving device; and
   updating the one or more lists if no response to the authentication challenge is received from the calling device, the update used for future calls, wherein the failure to respond is shared with others in a community for a consideration of heightened scrutiny for the calling device.

2. The method of claim 1, further comprising:
   determining an appropriate authentication procedure among multiple authentication procedure based on parameters of the calling device.

3. The method of claim 1, wherein the authentication challenge is sent using a separate modality of communication from the call.

4. The method of claim 3, wherein the separate modality of communication is a text message requiring a text response.

5. The method of claim 1, wherein the authentication challenge requires an audible response, further comprising:
   interpreting the audible response as to text,
   comparing the interpreted response as text to a correct entry.

6. The method of claim 1, further comprising:
   updating the one or more lists if the response to the authentication challenge is received from the calling device, the update used for future calls.

7. The method of claim 1, further comprising as part of the authenticating or separate from the authenticating:
   acquiring identification details of the calling devices that are not presented with the call.

8. The method of claim 7, wherein the identification details of the calling devices are acquiring by sending a hypertext link to the calling devices that upon selection gathers a unique identifier associated with the calling device.

9. The method of claim 1, further comprising:
obtaining an outgoing call log, separate from a contact list of the receiving device, for inclusion on a list used in the determining whether to intercept the call.

10. The method of claim 1, wherein the intercepting occurs at the receiving device by software located on the receiving device.

11. The method of claim 1, wherein the intercepting occurs at one or more servers positioned in a call route between the calling device and the receiving device.

12. A system for blocking unwanted calls, the system comprising non-transitory computer-readable media such that when executed by a processor is operable to:
intercept a call being routed from a calling device to a receiving device, the intercepting occurring prior to the call being presented to the receiving device for an answer;
determine further routing of the intercepted call by comparing parameters of the intercepted call to one or more lists;
if it is determined that the call should be authenticated, send an authentication challenge to the calling device,
if a response is received to the authentication challenge, determine whether the response is correct;
if the response is correct, route the call to the receiving device; and
update the one or more lists if no response to the authentication challenge is received from the calling device, the update used for future calls, wherein the failure to respond is shared with others in a community for a consideration of heightened scrutiny for the calling device.

13. The system of claim 12, wherein the non-transitory computer-readable media when executed is further operable to:
determine an appropriate authentication procedure among multiple authentication procedure based on parameters of the calling device.

14. The system of claim 12, wherein the authentication challenge is sent using a separate modality of communication from the call.

15. The system of claim 14, wherein the separate modality of communication is a text message requiring a text response.

16. The system of claim 12, wherein the authentication challenge requires an audible response and the non-transitory computer-readable media when executed is further operable to:
interpret the audible response as to text,
compare the interpreted response as text to a correct entry.

17. The system of claim 12, wherein the non-transitory computer-readable media when executed is further operable to:
update the one or more lists if the response to the authentication challenge received from the calling device, the update used for future calls.

* * * * *